United States Patent
Higashi

[11] 3,798,831
[45] Mar. 26, 1974

[54] WIND-UP TOY VEHICLE WITH DISENGAGEABLE WIND-UP MECHANISM OPERATED BY REAR AXLE ROTATION

[75] Inventor: Kisaburo Higashi, Mibu-Mach, Japan

[73] Assignee: Tonka Corporation, Minneapolis, Minn.

[22] Filed: Jan. 26, 1972

[21] Appl. No.: 220,833

[52] U.S. Cl. ................................................. 46/206
[51] Int. Cl. ............................................ A63h 17/00
[58] Field of Search .............................. 46/206, 208

[56] References Cited
UNITED STATES PATENTS
2,057,557   10/1936   Cookson ............................... 46/206

FOREIGN PATENTS OR APPLICATIONS
523,013   4/1931   Germany .............................. 46/206
470,479   8/1937   Great Britain ........................ 46/206
635,944   4/1950   Great Britain ........................ 46/206

Primary Examiner—F. Barry Shay
Attorney, Agent, or Firm—Carlsen, Carlsen & Sturm

[57] ABSTRACT

A toy wheeled vehicle having a wind-up spring for propelling the vehicle over a floor surface wherein the wheels have a driving connection with the spring to wind the spring as the vehicle is manually moved in a forward direction over the surface, the driving connection including a slip clutch to break said connection with the spring when the vehicle is moved rearwardly over the surface, and the driving connection only being operative when downward pressure is applied to the vehicle. The wound spring in turn has a driving connection with the wheels to propel the vehicle over the surface but said connection is automatically broken when the force of the spring is exhausted.

3 Claims, 3 Drawing Figures

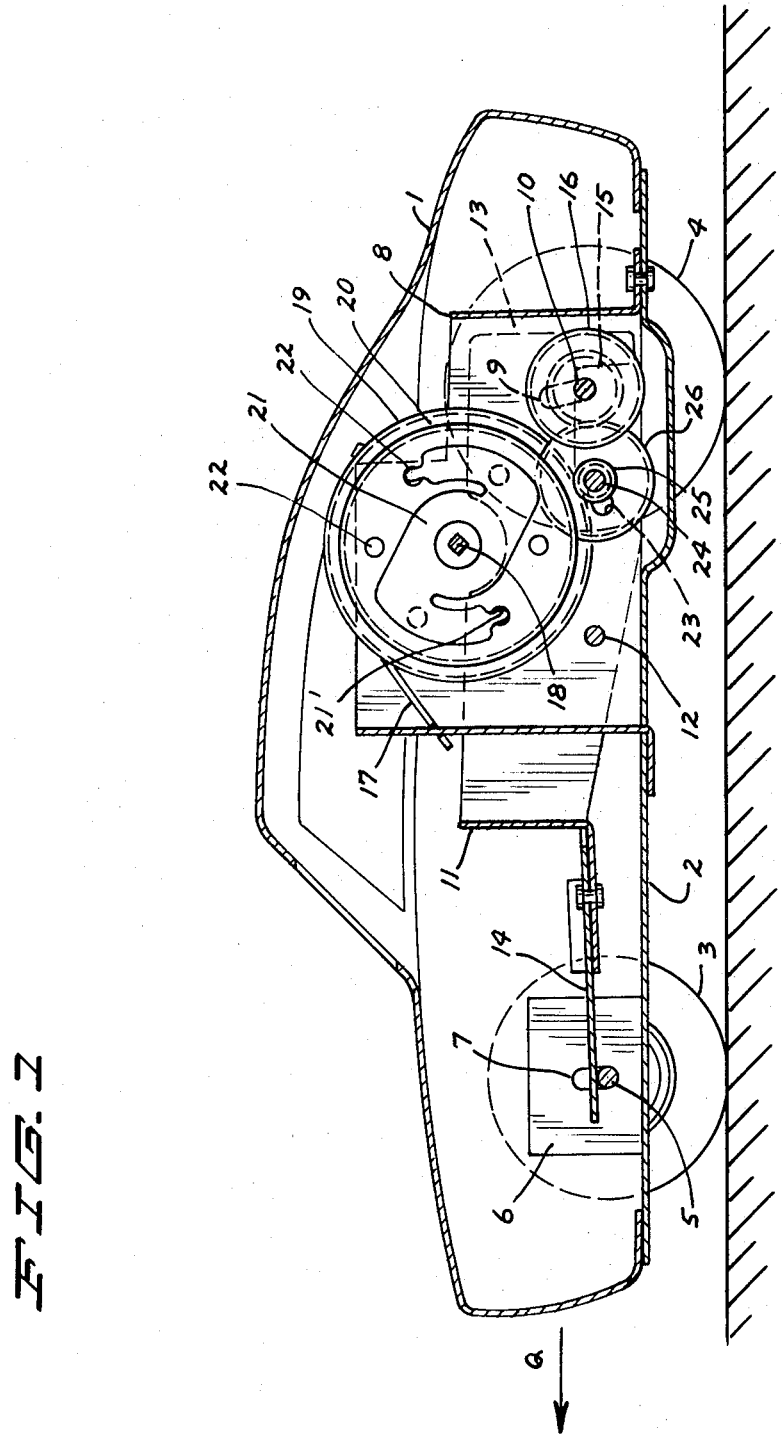

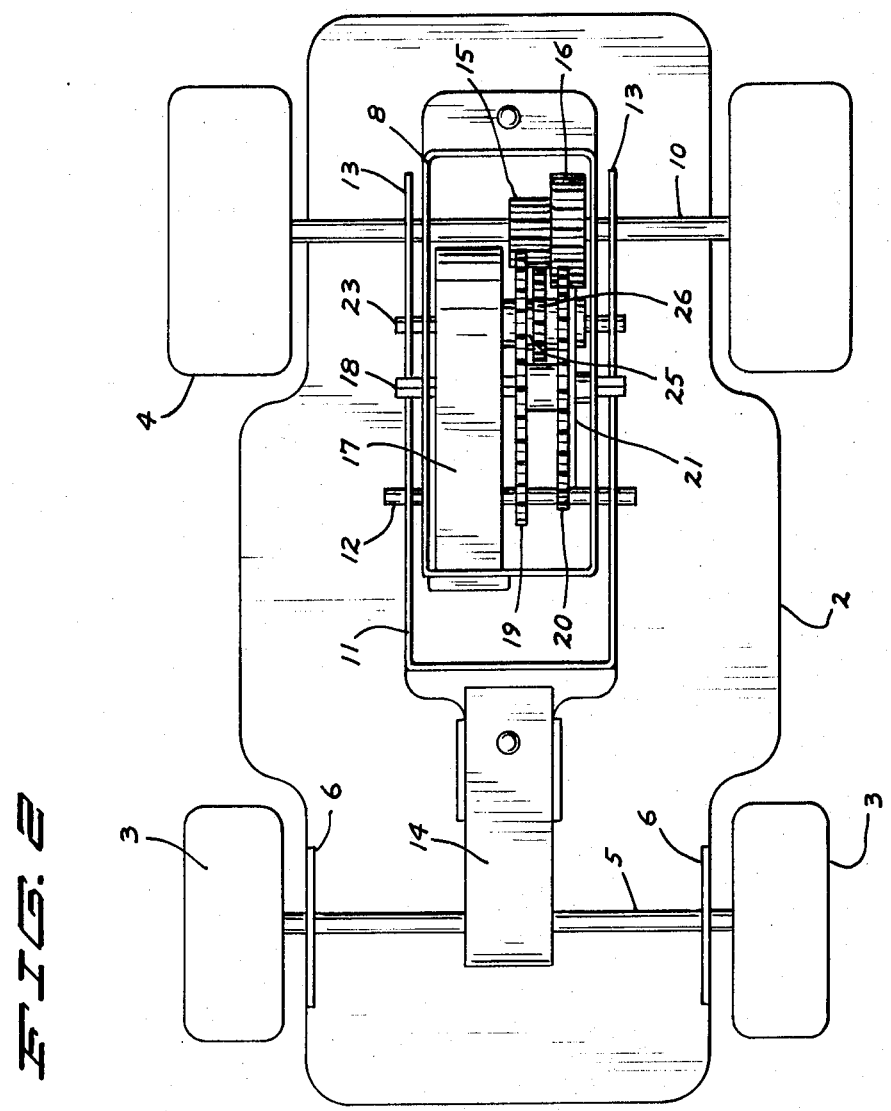

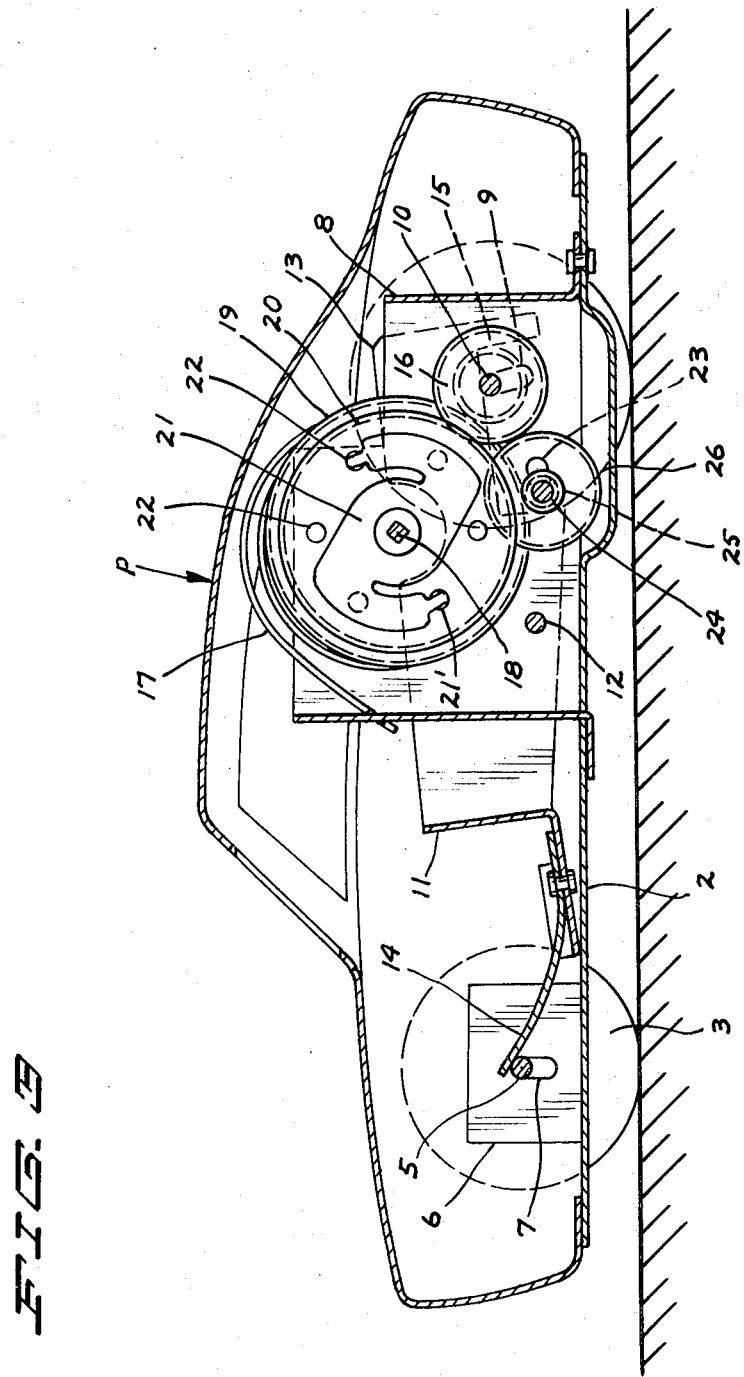

WIND-UP TOY VEHICLE WITH DISENGAGEABLE WIND-UP MECHANISM OPERATED BY REAR AXLE ROTATION

BACKGROUND OF THE INVENTION

Toy vehicles are frequently provided with an internal wind-up spring mechanism generally connected to the rear ground wheels for propelling the vehicle over a ground or floor surface. The wind-up mechanism may be wound by a key or by an extra ground wheel having connection with the mechanism to wind the spring as the wheel is rolled over the floor surface. In still another form the spring may be wound through a driven connection with the regular vehicle ground wheels whereby as the vehicle is manually moved over the floor surface the connection will build up energy in the spring which returns to the ground wheels to propel the vehicle over the surface when it is released. It is with the last mentioned type of vehicle that the present invention is primarily concerned.

Heretofore known ground wheel wind-up mechanisms have not been satisfactory for one or more of several reasons. Generally there has been a set drive train between the ground wheels and spring whereby rotation of the ground wheels in the reverse direction from that intended will damage the spring or drive mechanism. Other structures do not permit free ground wheel rotation where winding of the spring mechanism is not desired. In still others the drive train between the ground wheels and spring mechanism is complicated and subject to ready breakage and wear or requires movement of the vehicle over a considerable distance in a single direction before complete winding is accomplished.

SUMMARY OF THE INVENTION

An object of the present invention is to provide a wheeled toy vehicle with a wind-up mechanism which is wound through a drive connection with the ground wheels by manually moving the vehicle in a single direction over a floor surface or the like and wherein the drive connection is automatically broken when the vehicle is moved in a reverse direction.

Another object of the invention is to provide a wheeled toy vehicle with a wind-up mechanism which can be wound up by pushing the vehicle back and forth over a very short distance on a floor surface.

Still another object of the invention is to provide a wheeled toy vehicle with a flexible frame allowing the vehicle to be manually depressed against a floor surface to drivingly engage the ground wheels with the winding mechanism to store energy in the same, then retain a driving connection between the winding mechanism and wheels when the downward pressure is removed to move the vehicle over a floor surface, and wherein said driving connection is automatically disengaged when the energy of the winding mechanism has been exhausted.

With these and other objects in view the invention broadly comprises a toy vehicle having a chassis supported on front and rear axles respectively carrying ground wheels, the chassis being vertically movable with respect to said axles between raised and lowered positions, spring means acting between the chassis and at least one axle to yieldably retain the chassis in raised position, a winding shaft journaled on the chassis, a middle shaft journaled on the chassis, a spiral spring having one end fixed to the winding shaft and the other end held by the chassis whereby as the winding shaft is wound in a first direction the spring will be wound to store energy, gear means on the rear axle engageable with gear means on the winding shaft to wind the latter when the chassis is lowered and manually moved over a floor surface, and a gear train running from the winding shaft to the middle shaft and then to one axle for transmitting unwinding motion of the shaft to the ground wheels, the middle shaft being movable to break the gear train when the energy of the spring has been spent.

BRIEF DESCRIPTION OF THE DRAWINGS

In the drawings:

FIG. 1 is a longitudinal vertical section through a toy showing the winding mechanism in side elevation in wound-up condition and in driving engagement with the ground wheels.

FIG. 2 is a plan view of the vehicle driving mechanism in the condition of FIG. 1.

FIG. 3 is a side elevation of the winding mechanism similar to FIG. 1 but with the vehicle body depressed so that the mechanism is in condition for winding the spring.

DESCRIPTION OF THE PREFERRED EMBODIMENT

Referring now more particularly to the drawings reference numerals will be used to denote like parts or structural features in the different views. The toy vehicle is denoted generally by the numeral 1 and is provided with an integral chassis 2. The front and rear pairs of wheels for the vehicle are respectively denoted at 3 and 4. The axle 5 carrying the front wheels 3 is loosely fitted in vertical slots 7 formed in bracket 6 mounted on the chassis 2.

A main gear frame 8 is integrally mounted on chassis 2, and the axle 10 carrying the rear wheels 4 is loosely fitted in upright slots 9 formed in gear frame 8. A sub-gear frame 11 extends along either side of main gear frame 8 and is pivotally connected thereto by a horizontally extending pivot pin 12. The side plates 13 of frame 11 rest against the top of axle 10 and a leaf spring 14 extends forwardly from the frame 11 and rests against the top of axle 5.

It will thus be understood that the frame members 8 and 11 are normally in the relative position shown in FIG. 1. However, when the vehicle is placed upon the floor surface F and the body 1 is pressed downwardly in the direction of arrow P, chassis 2 and main gear frame 8 are depressed to the position shown in FIG. 3. This causes the sub-gear frame 11, with its side plates 13 resting upon axle 10, to tilt forwardly about the pivot pin 12 bending the leaf spring 14 as shown to store resilient force. When downward pressure is removed from the body, the spring 14 returns the vehicle to its original condition shown in FIG. 1.

The rear axle 10 has a small gear 15 and a larger gear 16 fixed thereon within the main frame 8. A winding shaft 18 for a flat spiral spring 17 having one end fixed thereto and the other end held in the frame 8 is transversely journaled in the longitudinally medial portion of frame 8. An inner gear 19 is fixedly mounted on shaft 18 while a smaller outer gear 20, which also serves as a clutch disk, is journaled on the shaft. Outer gear 20 is longitudinally aligned with gear 16 on axle 10 to come into meshing engagement therewith when chassis 2 and frame 8 are depressed as hereinbefore described.

A ratchet pawl member 21 is fixedly mounted on shaft 18 and has a pair of spring tensioned pawl arms terminating in fingers 21' adapted to engage in catch apertures 22 formed in gear 20 so that gear 20 may rotate relative to the pawl member in a counterclockwise direction as viewed in FIGS. 1 and 3 but is locked to the pawl member against relative rotation in a clockwise direction.

The main gear frame 8 has arcuate slots 23 formed about the axis of the shaft 18 located in its lower portion through which a middle shaft 24 extends. A small gear 25 and a larger gear 26 are fixedly mounted on shaft 24. Gear 25 is longitudinally aligned with and is in constant meshing engagement with gear 19 on shaft 18 while the larger gear 26 is longitudinally aligned with and adapted to mesh with gear 15 mounted on axle 10.

Operation of the invention will now be explained. When it is desirable to wind the spring 17 for the purpose of storing energy to propel the toy forwardly in the direction of arrow Q in FIG. 1, the body 1 is first depressed in the direction of arrow P. This moves chassis 2 and main frame 8 to the position shown in FIG. 3 and the gear 20 is brought into meshing engagement with the larger gear 16 on rear axle 10. Then as the toy, in the condition of FIG. 3, is rolled forwardly along the floor surface F the rear wheels 4 will be rotated by friction with the surface and such rotation will be transmitted through gear 16, gear 20, and pawl member 21 to shaft 18 to wind spring 17. As this occurs gear 19 meshing with gear 25 will cause shaft 24 to slide forwardly to an idle position with gear 26 disengaged from gear 15.

In the event that the body 1 is moved rearwardly or in a direction opposite to arrow Q, in its depressed condition, axle 10, gear 16 and gear 20 will be rotated reversely to that above described. However, with gear 20 being loosely journaled on shaft 18 it will freely rotate relative to pawl member 21 with the pawl fingers sliding over the apertures 22 and the reverse rotation of gear 20 is not transmitted to shaft 18. Accordingly, when body 1 is moved back and forth repeatedly in its depressed condition, the spring winding shaft 18 is rotated only in a winding direction so that the spring 17 may be wound tightly by such back and forth movement.

After winding of spring 17 has been completed the downward pressure on body 1 is relieved so that the chassis 2 and main gear frame 8 return to the condition shown in FIG. 1 by virtue of the force of spring 14. As this occurs gear 20 is disengaged from gear 16 on axle 10. Then as shaft 18 is rotated, in a counterclockwise direction as viewed in FIG. 1, by virtue of the stored energy in spring 17, gear 19 meshing with gear 25 will cause middle shaft 24 to move rearwardly in slot 23. This brings gear 26 on the middle shaft into meshing engagement with the small gear 15 on rear axle 10. Accordingly, the rotation of shaft 18 is transmitted through gears 19, 25, 26, and 15 and axle 10 to wheels 4 to propel the body 1 forwardly over the surface F in the direction of arrow Q. As soon as the stored energy of spring 17 is exhausted so that gear 19 is no longer positively driving gear 25, the middle shaft 24 will gravitationally slide forwardly in slot 23, disengaging gear 26 from gear 15. Accordingly, wheels 4 may be freely rotated when spring 17 is completely unwound and no downward pressure is applied to body 1 as all connection between axle 10 and the drive mechanism is broken.

The construction described provides a toy wheeled vehicle which permits quick winding of the propelling spring 17 by merely pressing the body 1 down and moving it back and forth over a very short distance. The winding is achieved easily and undue meshing of the drive gears is avoided. When the energy of the spring 17 is exhausted, the drive connection is broken to further eliminate wear on the gear mechanism. The toy can thus be readily operated by a small child to travel a relatively long distance and yet is very durable.

Having now therefore fully illustrated and described the invention, what is claimed to be new is the following:

I claim:

1. In a toy wheeled vehicle,
  a. a chassis including a main frame and front and rear axles each carrying a pair of ground wheels and having upright slots in which the rear axle is journaled for movement between upper and lower positions,
  b. a sub-gear frame pivoted on a horizontal transverse axis to the chassis for fore and aft tilting movement relative to the chassis and having a portion thereof engaging the rear axle,
  c. a winding shaft journaled on the chassis and having a spring acting between the shaft and chassis whereby as the shaft is rotated in one direction said spring will be wound to store energy,
  d. first means to wind the spring when the wheels are rolled in one direction over a ground surface including a first series of gears mounted to said chassis for intermeshing and connecting the rear axle to the winding shaft when the rear axle is in its upper position to transmit rotational movement of the rear axle caused by rolling engagement of the ground wheels thereon with such ground surface to the winding shaft and further including a slip clutch to disengage the connection with said winding shaft when the wheels are rolled in the opposite direction with said rear axle in said upper position,
  e. second means to propel the vehicle over a ground surface including a second series of gears mounted to said chassis for intermeshing and connecting the winding shaft to the rear axle when the rear axle is in its lower position to transmit stored energy of the spring from the shaft to the rear axle as the energy is released to rotate the ground wheels on said axle, and
  f. spring means acting between the chassis and sub-gear frame biasing said frame about said pivot axis in a direction to yieldably retain the rear axle in its lower position wherein said first series of gears is not in engagement.

2. The subject matter of claim 1 wherein said second series of gears includes a gear mounted on a middle shaft intermediate the winding shaft and rear axle, said middle shaft mounted on the chassis for movement to a position where said second series of gears is disengaged when the rear axle is in its upper position.

3. The subject matter of claim 1 wherein said spring means consists of a leaf spring on the sub-gear frame bearing downwardly upon the front axle.

* * * * *